[72] Inventors Charles William Earp
London;
Francis Giles Overbury, Cuffley, both of
England
[21] Appl. No. 881,352
[22] Filed Dec. 2, 1969
[45] Patented Jan. 4, 1972
[73] Assignee International Standard Electric
Corporation
New York, N.Y.
[32] Priority Feb. 21, 1969
[33] Great Britain
[31] 9,534/69

[54] DISTANCE-MEASURING EQUIPMENT
9 Claims, 6 Drawing Figs.
[52] U.S. Cl. .................................................... 343/112 D,
343/102
[51] Int. Cl. ...................................................... G01s 5/14
[50] Field of Search........................................... 343/112 D,
102, 113 DE

[56] References Cited
UNITED STATES PATENTS
3,098,225 7/1963 Anderson...................... 343/112 D UX
3,366,957 1/1968 Lode............................. 343/112 D

*Primary Examiner*—Richard A. Farley
*Assistant Examiner*—Richard E. Berger
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: The rhythmic spacing between two radiating antennas or the rhythmic spacing between two receiving antennas provide doppler-shifted signals which when measured in a receiver provide a measure of distance between the transmitting and receiving antennas. In a preferred embodiment, a beacon radiates a first frequency from a stationary antenna and a second frequency sequentially from a linear array of stacked antennas. At a receiver the signals received by each of a spaced antenna pair are separately processed to extract therefrom a first and second doppler frequency. The difference between said first and second doppler frequencies provides a measure of the distance. In another preferred embodiment, a first and second frequency are respectively radiated from a spaced pair of antennas. A first antenna coupled to a receiver provides a first beat frequency. A linear array of antennas sequentially coupled to said receiver provides a doppler shifted second beat frequency. The difference between said beat frequencies provides a measure of distance.

Inventors
CHARLES W. EARP
FRANCIS G. OVERBURY
By
Attorney

Inventors
CHARLES W. EARP
FRANCIS G. OVERBURY
By Philip M. Bolton
Attorney

DISTANCE-MEASURING EQUIPMENT

BACKGROUND OF THE INVENTION

1. Field of the Invention

The subject invention relates to distance measuring equipment.

2. Description of the Prior Art

In our copending U.S. Pat. application Ser. No. 823,904, filed on May 12, 1969 by C. W. Earp, there is described distance-measuring equipment in which two radiations of different frequency are radiated from separate points, and distance is measured by its proportionality to the reciprocal of the phase difference between the beat frequency between the two transmissions as received at two spaced locations.

The equipment operates with reasonable accuracy and without ambiguity over a distance range of about 40 to 1 and is satisfactory for certain applications, but there is a requirement in aircraft approach systems for a distance-measuring facility, including distance along runway, which would lead to the necessity for resolution of ambiguity of phase intercepts of greater than 360°.

SUMMARY OF THE INVENTION

It is an object of the invention to provide an improved distance-measuring system which overcomes the ambiguity resolution problem inherent in other systems.

It is another object of the present invention to measure distance as a function of frequency.

According to the invention, there is provided a distance-measuring system comprising means for generating a first frequency signal, antenna means for transmitting said first radiofrequency signal, means for generating a second radiofrequency signal, antenna means for transmitting said second radiofrequency signal, first antenna means for receiving said transmitted first and second radiofrequency signals, means for providing a first beat frequency coupled to said first antenna means, second antenna means for receiving said transmitted first and second radiofrequency signals, means for providing a second beat frequency coupled to said second antenna means, means associated with one of said antenna means for effectively doppler-shifting said second radiofrequency signal and means for measuring the difference in frequency between said first and second beat frequencies.

BRIEF DESCRIPTION OF THE DRAWINGS

The above-mentioned and other objects of this invention will become apparent by reference to the following description in conjunction with the accompanying drawings, in which.

DESCRIPTION OF THE PREFERRED EMBODIMENTS

As is shown in U.S. Pat. application Ser. No. 859,915 filed on Sept. 22, 1969 by C. W. Earp, a source of radiofrequencies may be coupled to a linear array of aerials via a commutator to simulate a constant velocity moving source. If a secondary frequency is radiated from a fixed source, such combined transmission causes the frequency of the beat between the two radiators to vary with direction. Hence, with two separate receivers operating from two spaced aerials, then as the beat frequency is approximately proportional to angle of direction, the difference between the beat frequencies measured at the two receiver locations is proportional to the reciprocal of distance.

Figure 1:
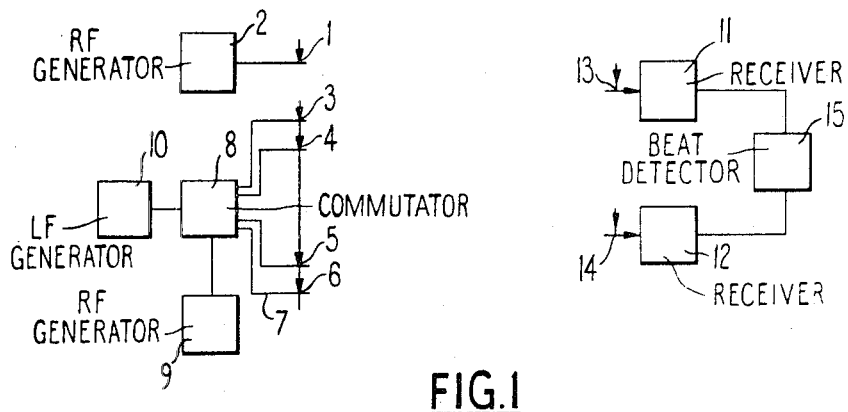
FIGS. 1 to 4 are block schematic diagrams of different embodiments of distance-measuring equipment with rhythmic variation of the spacing between two radiating sources at the transmitting station.

Referring to FIG. 1, a transmission station, (ground navigation beacon) comprises a fixed aerial 1 for radiating as a continuous wave signal radiofrequency energy of frequency F from a suitable radiofrequency generator 2. There is also a linear array of equally spaced aerials, some of which are shown at 3, 4, 5, and 6, each connected by a feeder such as 7 to a commutator 8. The commutator 8 is connected to a generator 9 of radiofrequency (F−f) differing by a fixed amount of from the frequency (F) of the source 2, and to a low-frequency generator 10.

Radio signals of frequency (F) from the generator 9 are fed successively and cyclically by the commutator 8 to each of the aerials of the array over the corresponding feeder, to simulate constant velocity unidirectional motion of a radiating source of continuous wave at a frequency (F). The commutation process is controlled by a signal from the low-frequency generator 10.

A mobile receiving station (aircraft mounted) comprises two separate receivers 11 and 12 whose aerials 13 and 14 are spaced in the same sense as the two beacon sources. The aerials 13 and 14 each receive both frequencies from the ground beacon and a beat note frequency can be derived as a result at each receiver.

Since the spacing between the ground beacon sources is rhythmically varied as already described, a doppler frequency shift is imposed on the signal from the simulated moving source received by both receivers, the doppler frequency shift as "seen" by one receiver being different to that "seen" by the other receiver.

Each receiver includes means for extracting the beat note frequency of the two received frequencies, the beat note frequency being proportional to angle of direction from the beacon, and the receiving station further comprises means 15 for determining the difference between the two beat note frequencies, this difference being proportional to the reciprocal of distance from the beacon.

The extraction and difference determination is carried out by established analog or digital techniques, and no further description of such techniques is considered necessary in this specification.

The remaining embodiments to be described operate on fundamentally the same principle as that involved in the description relating to FIG. 1, i.e., rhythmic variation between the spacing of either the sources (FIGS. 2 to 4) or the receiver aerials (FIGS. 5 and 6), the use of two different transmitted frequencies, and determining the difference between the two beat note frequencies at the receiver.

Like reference numerals have been used where appropriate throughout the drawings to indicate like components or functions, and the remaining description will be confined chiefly to illustrating the several different ways of achieving the rhythmic variation of the spacing between the sources or between the receiver aerials.

Figure 2:
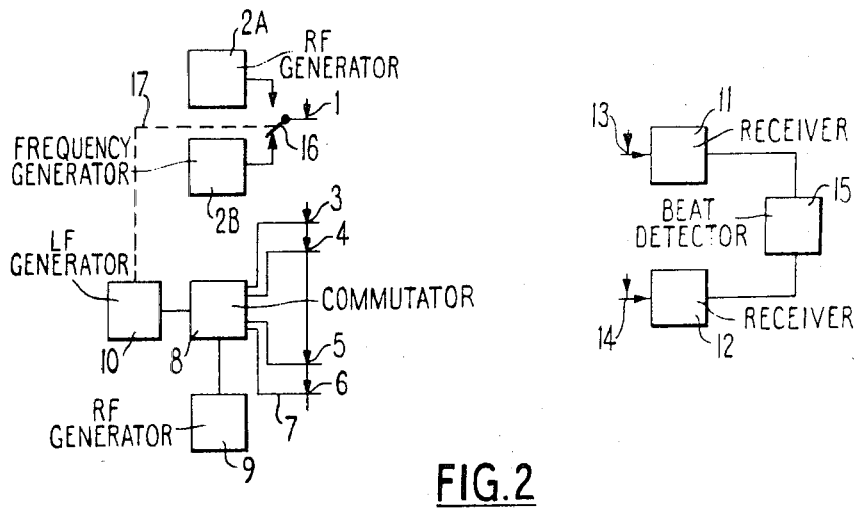

In FIG. 2 the ground beacon comprises a fixed aerial 1 and an array of equally spaced aerials 3, 4, 5, and 6 fed by a commutator 8 controlled by a low-frequency generator 10. In this embodiment there is bidirectional scanning of the array to simulate constant velocity to-and-fro motion of one of the sources. The frequency transmitted by the array is constant, and is supplied by generator 9 (frequency F). The frequency transmitted from aerial 1 requires to be changed, at each reversal of the scanning of the array, from a value above (or below) the scanned frequency to an equal value below (or above) the scanned frequency so that there is unidirectional displacement of the beat frequency between the two radiations. Accordingly there are effectively two radiofrequency generators 2A (frequency F+f) and 2B (frequency F−f). Each frequency is radiated in turn from aerial 1 over the appropriate half-cycle of the bidirectional sweep, and this is indicated by a changeover switch 16 controlled, as indicated by dashed line 17 by the generator 10. This representation is schematic, and it will be appreciated that the three required frequencies in practice may be derived from a single radiofrequency generator with appropriately synchronized upper and lower sideband generation.

Figure 3:
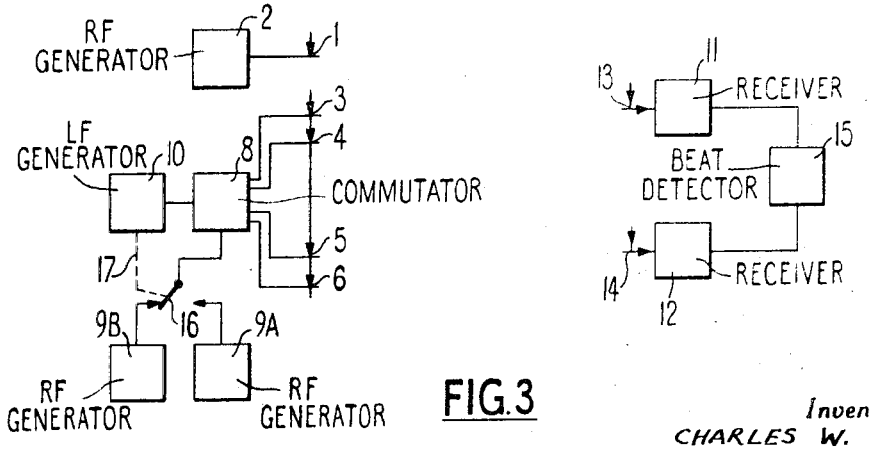

In FIG. 3 there is a fixed aerial 1 radiating a constant frequency, with bidirectional constant velocity sweeping of the array 3, 4, 5, 6. Synchronous frequency changing is carried out on the array radiated frequencies, generators 9A and 9B (frequency $F+f$ and $F-f$ respectively) being switched by changeover switch 16 controlled (17) by the generator 10.

Figure 4:
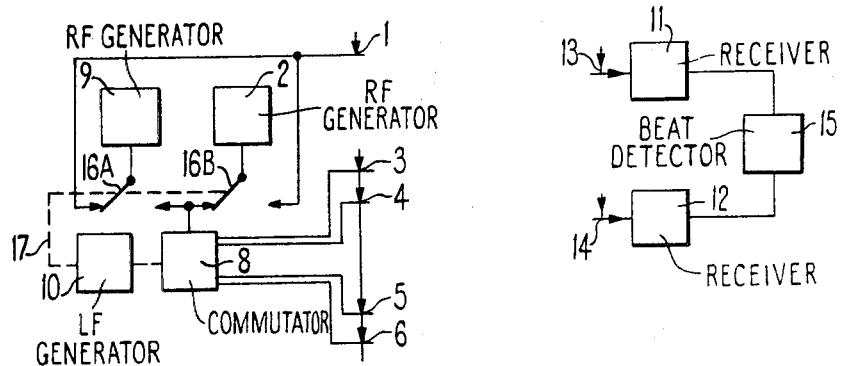

In FIG. 4, there is a fixed aerial 1, and array 3, 4, 5, and 6 which is swept bidirectionally at constant velocity. Only two frequencies are used ($F+f$ and $F-f$) which are interchanged at each half-period of commutation. Thus there are two generators 2 and 9 one for each of the required frequencies, and the synchronous interchange of frequencies is indicated by ganged changeover switches 16A and 16B controlled by the generator 10.

Figure 5:
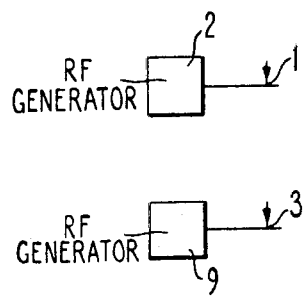
FIGS. 5 and 6 are block schematic diagrams of different embodiments of distance-measuring equipment with rhythmic variation of the spacing between two receiving aerials at the receiving station.
Figure 5:
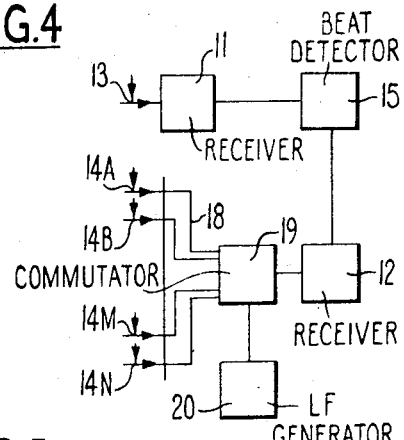
Figure 6:
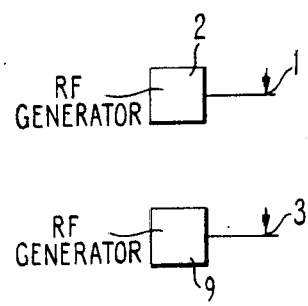
Figure 6:
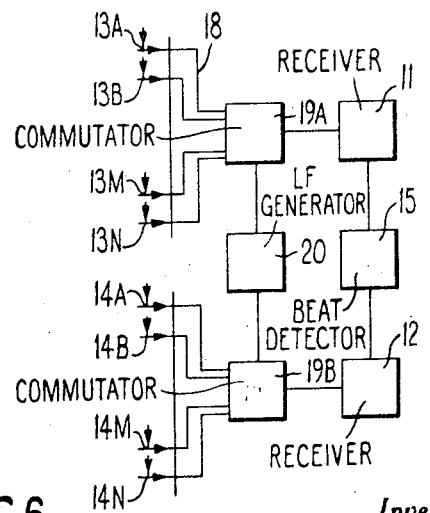

In the embodiments shown in FIGS. 5 and 6, the spacing between the two sources 1 and 3 each radiating a different frequency from respective generators 2 and 9, is fixed, and there is rhythmic variation of the spacing between the receiver aerials.

In FIG. 5 one receiver 11 has a single aerial 13, and the other receiver 12 has a linear array of equally spaced aerials 14A–14N each connected by a feeder 18 to a commutator 19 controlled by a low-frequency generator 20 so that each aerial 14 is connected in turn to the receiver 12 by unidirectional or bidirectional constant velocity commutating sweeps of the array.

In FIG. 6 each receiver 11 and 12 has a linear array of equally spaced aerials 13A–13N and 14A–14N, each aerial being connected in turn to the respective receiver via commutators 19A and 19B controlled by low-frequency generator 20 by unidirectional constant velocity commutation of each array in opposite directions.

Commutation of the radiating source to a vertical stack of radiators, giving beat frequency variation with angle of elevation, involves the use of two receiving aerials spaced in the same sense, i.e., in the vertical plane. Such a system has the advantage of all-round indication of distance, independent of heading of the aircraft using the system.

When the system is required for approach along a particular path to provide, for example, distance along runway, it is more convenient to make use of a horizontal commutated array, which may constitute the broadside array of an azimuth-defining approach beacon. In these circumstances the approaching aircraft would use forward-looking receiving aerials spaced in the horizontal plane, i.e., in the same sense.

We claim:

1. A distance-measuring system comprising:
   means for generating a first frequency signal;
   antenna means for transmitting said first radiofrequency signal;
   means for generating a second radiofrequency signal;
   antenna means for transmitting said second radiofrequency signal;
   first antenna means for receiving said transmitted first and second radiofrequency signals;
   means for providing a first beat frequency coupled to said first antenna means;
   second antenna means for receiving said transmitted first and second radiofrequency signals;
   means for providing a second beat frequency coupled to said second antenna means;
   means associated with one of said antenna means for effectively doppler-shifting said second radiofrequency signal; and
   means for measuring the difference in frequency between said first and second beat frequencies.

2. A distance-measuring system, according to claim 1, wherein said means for transmitting said second frequency signal includes;
   an array of aerials; and
   wherein said means for effectively doppler-shifting said second frequency signal includes means for commutating said second frequency signal to the aerials of said array to provide a rhythmic variation of the spacing between said antenna means for transmitting said first radiofrequency signal and said antenna means for transmitting said second radiofrequency signal.

3. A distance-measuring system, according to claim 2, wherein said means for generating a first radiofrequency signal includes means for generating a first frequency-modulated signal.

4. A distance-measuring system, according to claim 3, wherein said means for generating a first frequency-modulated signal includes;
   a first frequency generator;
   a second frequency generator; and
   means for combining the outputs of said first and second frequency generators to provide a frequency-modulated signal.

5. A distance-measuring system, according to claim 2, wherein said means for generating said second radiofrequency signal includes means for generating a second frequency-modulated signal.

6. A distance-measuring system, according to claim 5, wherein said means for generating a second frequency-modulated signal includes:
   a first RF generator;
   a second RF generator; and
   means for combining the outputs of said first and second RF generators to provide a second frequency-modulated signal.

7. A distance-measuring system, according to claim 5, wherein said means for generating a first radiofrequency signal includes means for generating a first frequency-modulated signal.

8. A distance-measuring system, according to claim 1, wherein said second antenna means comprises an array of aerials and wherein said means for effectively doppler-shifting said second frequency signal includes commutating means coupling said array aerials to said means for providing a first beat frequency to provide rhythmic variation of the spacing between said first and second antenna means.

9. A distance-measuring system, according to claim 8, wherein said first antenna means comprises a second array of aerials and wherein said means for effectively doppler-shifting said second frequency signal further includes commutating means coupling said second array of aerials to said means for providing a second beat frequency.

* * * * *